United States Patent Office 3,346,654
Patented Oct. 10, 1967

3,346,654
PROCESS FOR THE PRODUCTION OF POLY-ALKYLCYCLOHEXENES AND POLYALKYL-BENZENES
Masataka Amagasa and Tadashi Yamaguchi, Sendai-shi, Japan, assignors to Chiyoda Kakokensetsu Kabushiki Kaisha, Tokyo, Japan, a corporation of Japan
No Drawing. Filed Mar. 17, 1965, Ser. No. 440,595
The portion of the term of the patent subsequent to Oct. 11, 1983, has been disclaimed
4 Claims. (Cl. 260—666)

This invention relates to a process for producing polyalkylcyclohexenes (polyalkyltetrahydrobenzenes) and polyalkylbenzenes from polyalkylcyclohexadienes by contacting the latter with alkali metal amide or alkaline earth metal amide in the presence of liquid ammonia.

The present invention results from part of our studies in organic chemistry utilizing liquid ammonia and its application.

One of the objects of the present invention is to produce polyalkylcyclohexenes and polyalkylbenzenes from polyalkylcyclohexadienes.

A more specific object is to carry out the reaction in liquid ammonia.

Still further objects and the entire scope of applicability of the present invention will become apparent from the detailed description given hereinafter.

It is presumed that polyalkylcyclohexadienes contain many isomers and polyalkylcyclohexenes also contain many isomers and upon our studies it has been found that polyalkylcyclohexenes and polyalkylbenzenes approximately equivalent thereto were produced finally by causing alkali metal amide or alkaline earth metal amide in liquid ammonia to react with these polyalkylcyclohexadienes due to the disproportionation or isomerization reaction.

In accordance with the present invention polyalkylcyclohexadienes containing 2 to 3 alkyl radicals having from 1 to 3 carbon atoms such as dimethyl-, trimethyl-cyclohexadienes, diethyl-, triethyl-cyclohexadienes, dipropyl-, tripropyl-cyclohexadienes, are employed as a raw material.

It is suitable to use $LiNH_2$, $NaNH_2$, $KNH_2$, etc. as alkali metal amide, and $Ca(NH_2)_2$, $Ba(NH_2)_2$, etc. as alkaline earth metal amide; and $NaNH_2$ is most superior from the viewpoint of economy, while $KNH_2$ is most preferable in respect of solubility. In this case, very small amounts of these amides will accomplish the above-mentioned object without affecting the amount of polyalkylcyclohexadiene to be used since these amides react as catalysts with respect to disproportionation and isomerization reactions The temperature may be varied remarkably over a wide range and is preferably determined in the range of —70 to 50° C. Several examples in accordance with the present invention will be described as follows but do not imply any limitation.

*Example 1*

10 cc. of liquid ammonia, 0.2 g. of metallic sodium and a slight amount of ferric nitrate (catalyst for amidation) were placed into a pressure-proof glass reaction tube to convert completely the metallic sodium into sodium amide $NaNH_2$.

Then, with this tube was connected another pressure-proof glass reaction tube filled with a solution of 2 g. of 1,3-dimethyl-(3,6)-cyclohexadiene and 10 cc. of liquid ammonia so that this solution was fed into said reaction tube. When the mixture was left to stand at a room temperature for several minutes, the liquid ammonia solution displayed a red-brown color. After leaving the mixture at room temperature for several hours, ammonia was discharged to be recovered. 20 cc. of water was added gradually to the residue, thus producing an oily layer. This oily layer was separated and analyzed by means of gas chromatography. This showed the presence of 0.9 g. of 1,3-dimethyl-(1)-cyclohexene and 0.95 g. of m-xylene.

*Example 2*

Upon using 2 g. of 1,4-dimethyl-(1,4)-cyclohexadiene instead of 1,3-dimethyl-(3,6)-cyclohexadiene, the same treatment as in the case of Example 1 was carried out. 0.9 g. of 1,4-dimethyl-(1)-cyclohexene and 0.95 g. of p-xylene were obtained.

*Example 3*

Upon using 2 g. of 1,4-diethyl-(3,6)-cyclohexadiene instead of 1,3-dimethyl - (3,6) - cyclohexadiene, the same treatment as Example 1 was carried out, and the result showed the presence of 0.9 g. of 1,4-diethyl-(1)-cyclohexene and 0.95 g. of 1,4-diethylbenzene.

*Example 4*

Upon using 2 g. of 1,3,5-trimethyl-(2,5)-cyclohexadiene instead of 1,3-dimethyl-(3,6)-cyclohexadiene, the same treatment as in Example 1 was carried out, and the result showed the presence of 0.92 g. of 1,3,5-trimethyl-(1)-cyclohexene and 0.94 g. of 1,3,5-trimethylbenzene.

*Example 5*

10 cc. of liquid ammonia, 0.2 g. of metallic potassium and a small amount of ferric nitrate (a catalyst for amidation) were placed into a pressure-proof glass reaction tube so that metallic potassium was converted completely into potassium amide $KNH_2$. Then with this reaction tube was connected another pressure-proof glass reaction tube filled with a solution including 2 g. of 1,3-dimethyl-(2,6)-cyclohexadiene and 10 cc. of liquid ammonia in order to feed this solution into the first reaction tube. The liquid ammonia displayed the same red-brown color as in Example 1. After leaving the solution at room temperature for 2 or 3 hours, ammonia was discharged to be recovered. 20 cc. of water was added gradually to the residue thus producing an oily layer. This oily layer was separated and analyzed by means of gas chromatography. This showed the presence of 0.9 g. of 1,3-dimethyl-(1)-cyclohexene and 0.95 g. of m-xylene.

*Example 6*

Upon using potassium amide $KNH_2$ instead of $NaNH_2$ as in Examples 1, 2 and 4, the same treatment as in the just mentioned examples was performed. 1,3-dimethyl-(3,6)-cyclohexadiene, 1,4-dimethyl - (1,4) - cyclohexadiene and 1,3,5-trimethyl - (2,5) - cyclohexadiene were treated, and thus substantially equivalent compounds are obtained respectively in each example.

As described above, the present invention provides a method for producing easily polyalkylcyclohexenes and polyalkylbenzene from polyalkylcyclohexadienes by utilizing a peculiarity of liquid ammonia, and serves to develop a novel field in the petrochemical industry utilizing polyalkylcyclohexenes.

What we claim is:

1. A process for producing polyalkylcyclohexenes and polyalkylbenzenes consisting essentially of contacting polyalkylcyclohexadienes with alkali metal amide or alkaline earth metal amide in the presence of liquid ammonia.

2. A process as described in claim 1 wherein an alkali metal amide selected from the group consisting of $LiNH_2$, $NaNH_2$, and $KNH_2$ is employed.

3. A process as described in claim 1 wherein an alkaline earth metal amide selected from the group consisting of $Ca(NH_2)_2$, $Sr(NH_2)_2$ and $Ba(NH_2)_2$ is employed.

4. A process as described in claim 1 wherein polyalkyl-cyclohexadienes having from 2 to 3 alkyl radicals which consist of 1 to 3 carbon atoms are employed as a raw material.

References Cited

UNITED STATES PATENTS

| | | | |
|---|---|---|---|
| 2,432,843 | 12/1947 | Whitman | 260—666 |
| 3,278,618 | 7/1962 | Amagasa et al. | 260—666 |

OTHER REFERENCES

J. W. Mellor: Comprehensive Treatise on Inorganic and Theoretical Chemistry, Longmans, Green & Co., vol. 8, pp. 253–4, 1928.

PAUL M. COUGHLAN, JR., *Primary Examiner.*

DELBERT E. GANTZ, *Examiner.*

V. O'KEEFE, *Assistant Examiner.*